(12) United States Patent
Suzuki et al.

(10) Patent No.: US 11,867,809 B2
(45) Date of Patent: Jan. 9, 2024

(54) MEASUREMENT APPARATUS AND MEASUREMENT METHOD

(71) Applicant: Mitutoyo Corporation, Kawasaki (JP)

(72) Inventors: Yoshimasa Suzuki, Tsukuba (JP); Shinichi Hara, Tsukuba (JP); Shinji Komatsuzaki, Mito (JP); Ryusuke Kato, Tsukuba (JP); Hiroki Ujihara, Tsukuba (JP); Masayuki Nara, Tsukuba (JP); Tomotaka Takahashi, Tsukuba (JP)

(73) Assignee: Mitutoyo Corporation, Kawasaki (JP)

( * ) Notice: Subject to any disclaimer, the term of this patent is extended or adjusted under 35 U.S.C. 154(b) by 648 days.

(21) Appl. No.: 16/921,839

(22) Filed: Jul. 6, 2020

(65) Prior Publication Data

US 2021/0011155 A1 Jan. 14, 2021

(30) Foreign Application Priority Data

Jul. 4, 2019 (JP) .................................. 2019-125541

(51) Int. Cl.
*G01S 17/08* (2006.01)
*G01S 7/481* (2006.01)
*G01S 7/48* (2006.01)

(52) U.S. Cl.
CPC ............ *G01S 17/08* (2013.01); *G01S 7/4808* (2013.01); *G01S 7/4814* (2013.01)

(58) Field of Classification Search
CPC ...... G01S 17/08; G01S 7/4808; G01S 7/4814; G01S 7/4913; G01S 17/34; G01S 7/4917; G01S 7/4818

(Continued)

(56) References Cited

U.S. PATENT DOCUMENTS

2001/0009458 A1* 7/2001 Asaka ..................... G01S 17/10
356/28.5
2006/0071846 A1* 4/2006 Yanagisawa ............ G01S 7/481
342/54

(Continued)

FOREIGN PATENT DOCUMENTS

JP 3583906 B2 11/2004

OTHER PUBLICATIONS

Taketumi HARA: "Distance Sensing by FSL Laser and Its Application", OPTONEWS, vol. 7. No. 3, 2012, 10 pages (with English Translation).

*Primary Examiner* — Luke D Ratcliffe
(74) *Attorney, Agent, or Firm* — Oblon, McClelland, Maier & Neustadt, L.L.P.

(57) ABSTRACT

A measurement apparatus includes a laser apparatus, a branching part that branches a frequency-modulated laser beam output by the laser apparatus into a reference light and a measurement light; a beat signal generation part that generates a beat signal by mixing a reflected light and the reference light, a conversion part that converts the beat signal into a digital signal at a first sampling rate and frequency-analyses it, an extraction part that extracts a signal component corresponding to a cavity frequency from the frequency-modulated laser beam, a digital filter that digitally filters the extracted signal component at a second sampling rate; and a calculation part that calculates a difference in a propagation distance between the reference light and the measurement light.

10 Claims, 11 Drawing Sheets

(58) Field of Classification Search
USPC ...... 356/4.01, 5.01, 28, 5.09, 5.1, 3.01, 614,
356/4.07, 141.1, 4.1, 5.15, 3.1, 5.03, 3,
356/5.04, 4.09, 486, 27, 498, 5.08, 484,
356/5.05, 5.11, 5.02, 5.06, 3.11, 141.4,
356/3.03, 4.03, 4.06, 4.08, 398, 73, 138,
356/3.09, 3.12, 5.07, 482, 5.13, 3.02,
356/3.06, 341, 4.02, 3.08, 3.13, 3.14,
356/4.05, 139.04, 3.15, 485, 493, 5.12,
356/5.14 FOR, 130, 139.07, 3.05, 3.04,
356/4.04, 141.2, 222, 3.16, 435
See application file for complete search history.

(56) References Cited

U.S. PATENT DOCUMENTS

2014/0041456 A1* 2/2014 Rembe .................. G01H 9/00
73/655
2019/0064358 A1* 2/2019 Desai .................. G01S 7/4911

* cited by examiner

MEASUREMENT APPARATUS AND MEASUREMENT METHOD

CROSS-REFERENCE TO RELATED APPLICATIONS

The present application claims priority to Japanese Patent Applications number 2019-125541, filed on Jul. 4, 2019. The contents of this application are incorporated herein by reference in their entirety.

BACKGROUND OF THE INVENTION

A frequency-shifted feedback laser (FSFL) which is provided with a frequency shifter in a cavity (resonator) and outputs a plurality of longitudinal-mode lasers whose oscillation frequencies vary linearly with time is known. Also, an optical distance meter using such an FSFL is known (see, e.g., Patent Document 1, the Specification of Japanese Patent. No. 3583906 and Non-Patent Document 1, "Distance Sensing by FSF Laser and Its Application," by Takefumi HARA, Optonews, Vol. 7, No. 3, 2012, pp. 25-31).

An optical distance meter using a frequency-shifted feedback laser (FSFL) can acquire a large amount of three-dimensional information in a contactless manner, and has been used, for example, in design and production sites. The FSFL sometimes caused a reduction in measurement accuracy of the optical distance meter, since the cavity length (resonator length) may change due to environmental fluctuations such as temperature. In order to prevent the reduction in measurement accuracy, conventionally, it has been considered to reduce the environmental fluctuations by installing the FSFL in a constant-temperature chamber, to observe a change in the cavity length by monitoring outputs of the FSFL, and the like However, when an observation result of the change in the cavity length is used for a distance measurement, observation variation in the cavity length is superimposed on variation in the distance measurement, which causes an increase of variation in the distance measurement.

BRIEF SUMMARY OF THE INVENTION

The present invention has been made in view of this problem, and an object of the present invention is to enable an optical distance meter to measure a distance with high accuracy while suppressing an increase in cost.

A first aspect of the present disclosure provides a measurement apparatus for measuring a distance to an object to be measured, the measurement apparatus includes: a laser apparatus that has an optical cavity (laser resonator) and outputs a frequency-modulated laser beam with a plurality of modes; a branching part that branches a portion of the frequency-modulated laser beam output by the laser apparatus as a reference light and at least some of the remaining portion of the frequency-modulated laser beam as a measurement light a beat signal generation part that generates a beat signal by mixing the reference light and a reflected light that is reflected by radiating the measurement light onto the object to be measured; a conversion part that converts the beat signal into a digital signal at a first sampling rate and then performs a frequency analysis on the digital signal; an extraction part that extracts a signal component corresponding to a cavity frequency (resonator frequency) of the optical cavity and being superimposed on the frequency-modulated laser beam output from the laser apparatus; a digital filter that digitally filters the extracted signal component at a second sampling rate; and a calculation part that calculates a difference in a propagation distance between the reference light and the measurement light based on a result of the frequency analysis of the beat signal and the digitally filtered signal component.

A second aspect of the present disclosure provides a measurement method for measuring a distance to an object to be measured the measurement method includes: outputting a frequency-modulated laser beam with a plurality of modes from a laser apparatus having an optical cavity; branching a portion of the frequency-modulated laser beam as a reference light and at least some of the remaining portion as a measurement light; generating a beat signal by mixing the reference light and a reflected light that is reflected by radiating the measurement light onto the object to be measured; converting the beat signal into a digital signal at a first sampling rate and then performing a frequency analysis on the digital signal; extracting a signal component corresponding to a cavity frequency of the optical cavity and being superimposed on the frequency-modulated laser beam; digitally filtering the signal component at a second sampling rate; and calculating a difference in a propagation distance between the reference light and the measurement light based on a result of the frequency analysis of the beat signal and the digitally filtered signal component.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

[Configuration Examples of a Measurement Apparatus 100]

Figure 1:
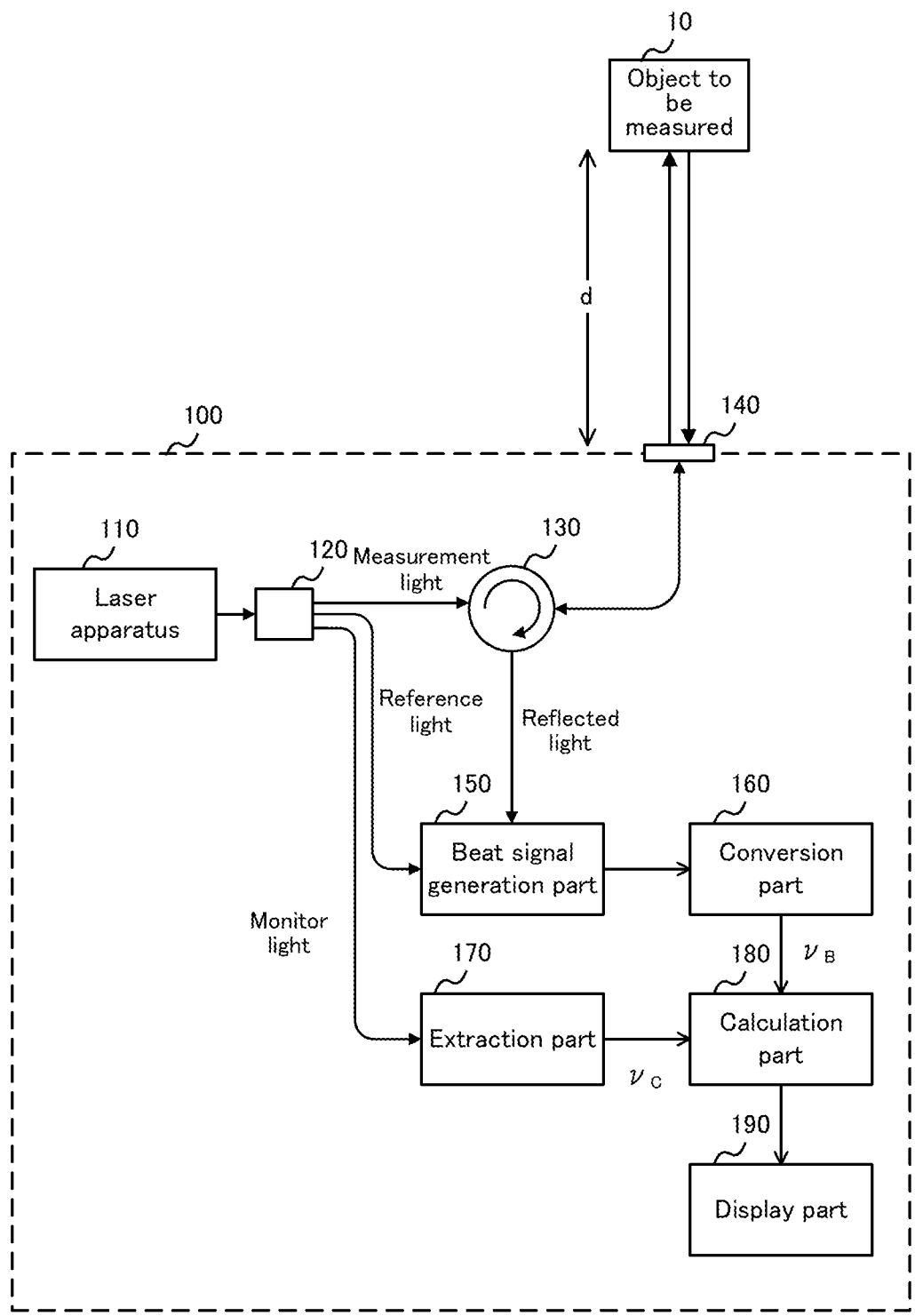
FIG. 1 shows a configuration example of a measurement apparatus 100 according to the present embodiment together with an object to be measured 10.

FIG. 1 shows a configuration example of a measurement apparatus 100 according to the present embodiment together with an object to be measured 10. The measurement apparatus 100 optically measures a distance between the measurement apparatus 100 and the object to be measured 10. Also, the measurement apparatus 100 may measure the three-dimensional shape of the object to be measured 10 by scanning a position of the laser beam radiated onto the object to be measured 10. The measurement apparatus 100 includes a laser apparatus 110, a branching part 120, an optical circulator 130, an optical head part 140, a beat signal generation part 150, a conversion part 160, an extraction part 170, a calculation part 180, and a display part 190.

The laser apparatus 110 has an optical cavity (laser resonator) and outputs a frequency-modulated laser beam with a plurality of modes. The laser apparatus 110 is provided with a frequency shifter in a cavity (resonator), and outputs a plurality of longitudinal mode lasers whose oscillation frequencies change linearly with the passage of time. The laser apparatus 110 is, for example, a frequency-shifted feedback laser (FSFL). The FSFL will be described later.

The branching part 120 branches the frequency-modulated laser beam output from the laser apparatus 110, with a portion of it as a reference light and at least some of the remaining portion of it as a measurement light. The branching part 120 branches the frequency-modulated laser beam output from the laser apparatus 110 into the reference light, the measurement light, and a monitor light, for example. The branching part 120 is, for example, a one-in-three-out fiber optic coupler. In the example of FIG. 1, the branching part 120 supplies the measurement light to the optical circulator 130, the reference light to the beat signal generation part 150, and the monitor light to the extraction part 170. FIG. 1 shows an example in which the branching part 120 is the one-in-three-out optical coupler, but the branching part 120 may alternatively be a combination of two one-in-two-out optical couplers.

The optical circulator 130 has a plurality of input/output ports. For example, the optical circulator 130 outputs a light, which is input from one port, to the next port, and outputs a light, which is input from the next port, to the port after next. FIG. 1 shows an example in which the optical circulator 130 has three input/output ports. In this case, the optical circulator 130 outputs the measurement light supplied from the branching part 120 to the optical head part 140. Also, the optical circulator 130 outputs a light input from the optical head part 140 to the beat signal generation part 150.

The optical head part 140 radiates the light input from the optical circulator 130 toward the object to be measured 10. The optical head part 140 includes, for example, a collimator lens. In this case, the optical head part 140 first adjusts the light input from the optical circulator 130 via an optical fiber into a beam shape using the collimator lens, and then outputs the light.

Also, the optical head part 140 receives a reflected light of the measurement light radiated onto the object to be measured 10. The optical head part 140 focuses the received reflected light onto the optical fiber with a collimator lens and supplies it to the optical circulator 130. In this case, the optical head part 140 may include one common collimator lens, and the collimator lens may irradiate the object to be measured 10 with the measurement light, and may receive the reflected light from the object to be measured 10. The distance between the optical head part 140 and the object to be measured 10 is defined as d.

Alternatively, the optical head part 140 may include a focusing lens. In this case, the optical head part 140 focuses the light input from the optical circulator 130 via the optical fibers on the surface of the object to be measured 10. The optical head part 140 receives at least a part of the reflected light reflected on the surface of the object to be measured 10. The optical head part 140 focuses the received reflected light onto an optical fiber using the focusing lens and supplies the light to the optical circulator 130. Also in this case, the optical head part 140 may include one common focusing lens, and that focusing lens may irradiate the object to be measured 10 with the measurement light and receive the reflected light from the object to be measured 10.

The beat signal generation part 150 receives, from the optical circulator 130, the reflected light that is the measurement light radiated onto and reflected from the object to be measured 10. Also, the beat signal generation part 150 receives the reference light from the branching part 120. The beat signal generation part 150 mixes the reflected light and the reference light to generate a beat signal. The beat signal generation part 150 includes, for example, a photoelectric conversion element, converts the beat signal into an electrical signal, and outputs the electrical signal.

Here, since the reflected light travels back and forth across the distance from the optical head part 140 to the object to be measured 10, a difference in a propagation distance corresponding to at least the distance 2d occurs as compared with the reference light. Since the oscillation frequency of the light output from the laser apparatus 110 changes linearly with the passage of time, a frequency difference, which is dependent on a propagation delay corresponding to the difference in the propagation distance, occurs between the oscillation frequency of the reference light and the oscillation frequency of the reflected light. The beat signal generation part 150 generates a beat signal corresponding to such a frequency difference.

The conversion part 160 detects the frequency of the beat signal by frequency-analyzing the beat signal generated by the beat signal generation part 150. Here, the frequencies of the beat signals are defined as $v_B$.

The extraction part 170 extracts a signal component corresponding to the cavity frequency (resonator frequency) of the optical cavity and is superimposed on the frequency-modulated laser beam output from the laser apparatus 110. For example, the extraction part 170 extracts a signal component of the frequency equal to the cavity frequency corresponding to the cavity length (resonator length) of the laser apparatus 110 from among signal components included in the frequency-modulated laser beam on the basis of the monitor light. Here, the cavity frequency is defined as $v_C$.

The calculation part 180 calculates a difference of the propagation distance between the reference light and the measurement light based on a detection result of the conversion part 160 and an extraction result of the extraction part 170. For example, the calculation part 180 calculates the distance d from the optical head part 140 to the object to be measured 10 on the basis of the frequency $v_B$ of the beat signal and the cavity frequency $v_C$.

The display part 190 displays the calculation result of the calculation part 180. The display part 190 may include a display or the like and display the calculation result. Also, the display part 190 may store the calculation result in a storage unit or the like. The display part 190 may supply the calculation result to an external device via a network or the like.

The measurement apparatus 100 described above can measure the distance d between the measurement apparatus 100 and the object to be measured 10 by analyzing the frequency difference between the reflected light of the measurement light radiated onto the object to be measured 10 and the reference light. That is, the measurement apparatus 100 can form a non-contact and non-destructive optical distance meter. Next, a more detailed configuration of the measurement apparatus 100 will be described.

[Configuration Example of the Laser Apparatus 110]

Figure 2:
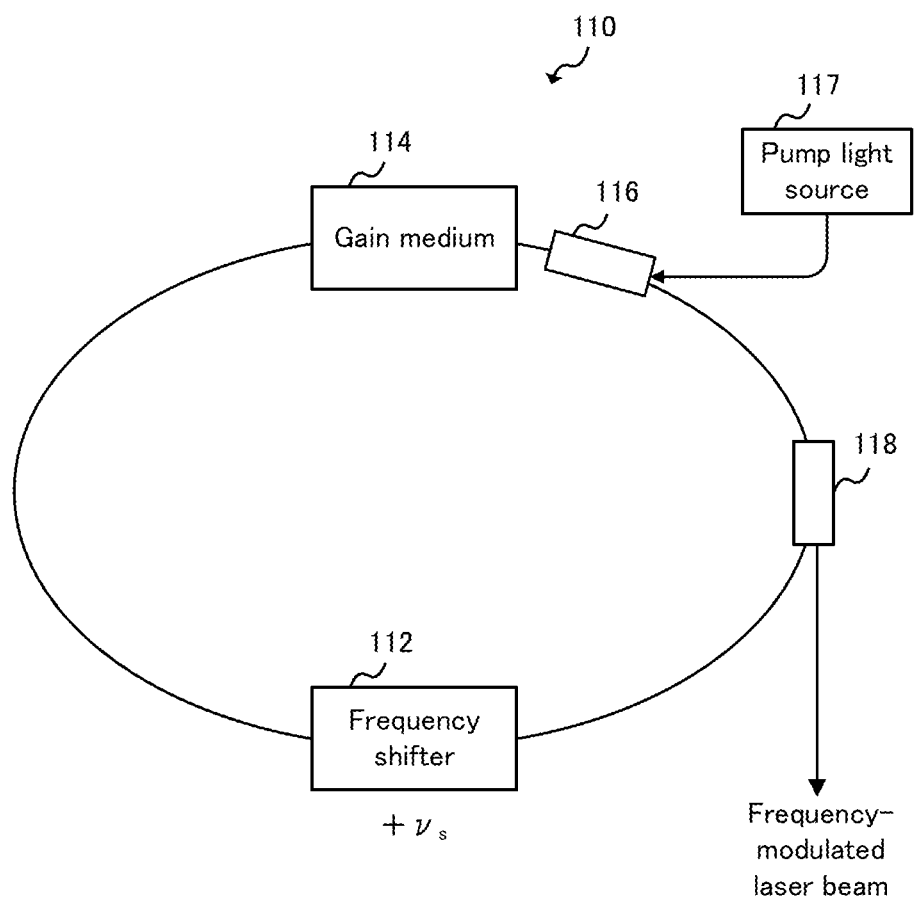
FIG. 2 shows a configuration example of a laser apparatus 110 according to the present embodiment.

FIG. 2 shows a configuration example of the laser apparatus 110 according to the present embodiment. The laser apparatus 110 of FIG. 2 shows an example of the FSFL. The laser apparatus 110 includes an optical cavity and oscillates a loser beam in the optical cavity. The optical cavity of the laser apparatus 110 includes an optical cavity including a frequency shifter 112, a gain medium 114, a WDM coupler 116, a pump light source 117, and an output coupler 118.

The frequency shifter 112 shifts a frequency of a light to be input by an approximately constant frequency. The frequency shifter 112 is, for example, an acousto-optic frequency shifter (AOFS) having acousto-optic elements. Here, an amount of the frequency shift by the frequency shifter 112 is defined as $+v_s$. That is, the frequency shifter 112 shifts the frequency of the light circulating around the cavity to increase the frequency by $v_s$ for each round.

The gain medium 114 is supplied with a pump light and amplifies the input light. The gain medium 114 is, for example, an optical fiber doped with impurities. The impurities are, for example, rare earth elements such as erbium, neodymium, ytterbium, terbium, thulium, or the like. The gain medium 114 is supplied with the pump light from the pump light source 117 via the WDM coupler 116. The output coupler 118 outputs, to an external device, a part of the light that has been laser oscillated in the cavity.

That is, the laser apparatus 110 shown in FIG. 2 contains a fiber ring laser having the frequency shifter 112 in the cavity. The laser apparatus 110 preferably further includes an isolator in the cavity. Also, the laser apparatus 110 may have an optical bandpass filter that passes light of a predetermined wavelength band in the cavity. Frequency characteristics of the laser beam output from the laser apparatus 110 will be described below.

Figure 3:
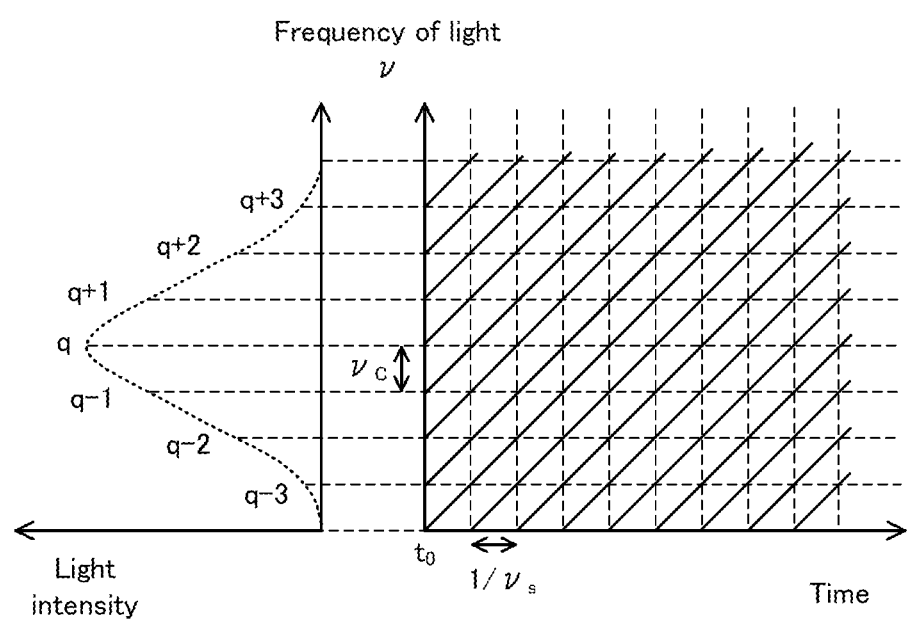
FIG. 3 shows an example of a laser beam output from the laser apparatus 110 according to the present embodiment.

FIG. 3 shows an example of the laser beam output from the laser apparatus 110 according to the present embodiment. FIG. 3 shows, on the left, a light spectrum of the laser beam output by the laser apparatus 110 at the time $t_0$. In the light spectrum, the horizontal axis indicates the light intensity, and the vertical axis indicates the frequency of light. Also, a plurality of longitudinal modes of the light spectrum are denoted by the numbers q. The frequencies of the plurality of longitudinal modes are arranged at approximately constant frequency intervals. Supposing that $\tau_{RT}(=1/v_c)$ denotes the time for light to go around the cavity, the plurality of longitudinal modes are arranged at intervals of $1/\tau_{RT}(=v_c)$, as represented by the following equation. It should be noted that, $v_0$ is the initial frequency of the light spectrum at the time $t_0$.

$$v_q(t_0) = v_0 + \frac{q}{\tau_{RT}} \quad \text{[Equation 1]}$$

FIG. 3 shows, on the right, changes in frequencies with the passage of time of the plurality of longitudinal modes output by the laser apparatus 110. On the right side of FIG. 3, the horizontal axis indicates the time and the vertical axis indicates the frequency. That is, FIG. 3 shows a change over time in the frequency of the laser beam output from the laser apparatus 110 on the right side, and shows an instantaneous frequency of the laser beam at the time $t_0$ on the left side.

In the laser apparatus 110, each time the light in the cavity goes around the cavity, the frequency shifter 112 increases the frequency of the light traveling around the cavity by $v_s$. That is, since the frequency of each of the modes increases by $v_s$, for every passing of $\tau_{RT}$, the rate of change of frequency dv/dt (i.e., chirp rate) becomes approximately equal to $v_s/\tau_{RT}$. Therefore, the plurality of longitudinal modes represented by Equation 1 change as shown in the following equation with the passage of the time t.

$$v_q(t_0) = v_0 + \frac{v_s}{\tau_{RT}}t + \frac{q}{\tau_{RT}} \quad \text{[Equation 2]}$$

[Details of a Distance Measurement Process]

The measurement apparatus 100 according to the present embodiment measures the distance d between the optical head part 140 and the object to be measured 10 by using the laser apparatus 110 that outputs the frequency elements represented by Equation 2. Suppose that an optical path difference between the reference light and the reflected light is only the distance 2d, which is the reciprocated distance d, and the propagation delay corresponding to the distance 2d is Δt. That is, when the measurement light is reflected and returned from the object to be measured 10 at the time t, the frequency of the returned reflected light approximately matches the past frequency that is a time Δt earlier than the time t, and therefore can be expressed by the following equation.

$$v_q(t - \Delta t) = v_0 + \frac{v_s}{\tau_{RT}}(t - \Delta t) + \frac{q}{\tau_{RT}} \quad \text{[Equation 3]}$$

On the other hand, the reference light at the time t can be expressed by the following equation in a similar manner as with Equation 2, where the reference light is $v_{q'}(t)$.

$$v_{q'}(t) = v_0 + \frac{v_s}{\tau_{RT}}t + \frac{q'}{\tau_{RT}} \quad \text{[Equation 4]}$$

Because the beat signal generation part 150 superimposes the reflected light and the reference light, a plurality of beat signals between the plurality of longitudinal modes expressed by Equation 3 and the plurality of longitudinal modes expressed by Equation 4 are generated. Supposing that the frequencies of such beat signals are $v_B(m, d)$, $v_B(m, d)$ can be expressed by the following equation from Equations 3 and 4, where m is an interval of the longitudinal mode numbers (=q−q') and Δt=2d/c.

$$v_B(m, d) = v_{q'}(t) - v_q(t - \Delta t) = \frac{v_s}{\tau_{RT}} \cdot \frac{2d}{c} - \frac{m}{\tau_{RT}} \quad \text{[Equation 5]}$$

From Equation 5, the distance d is expressed by the following equation, where $1/\tau_{RT}=v_c$.

$$d = \frac{c}{2v_s v_c} \{v_B(m, d) + mv_c\} \quad \text{[Equation 6]}$$

From Equation 6, it can be understood that the distance d can be calculated from a frequency observation result of the beat signal by determining the interval m of the longitudinal mode numbers. It should be noted that the interval m can be determined by detecting a change in beat signals when the amount of frequency shill $v_s$ of the laser apparatus 110 is changed. Since such a method of determining the interval m is known, as described in Patent Document 1 or the like, its detailed description is omitted.

Since the observed beat signal is always a positive frequency, in calculation, the beat signal generated on the negative frequency side is folded back on the positive side and observed as an image signal. Next, the generation of such an image signal will be described.

Figure 4:
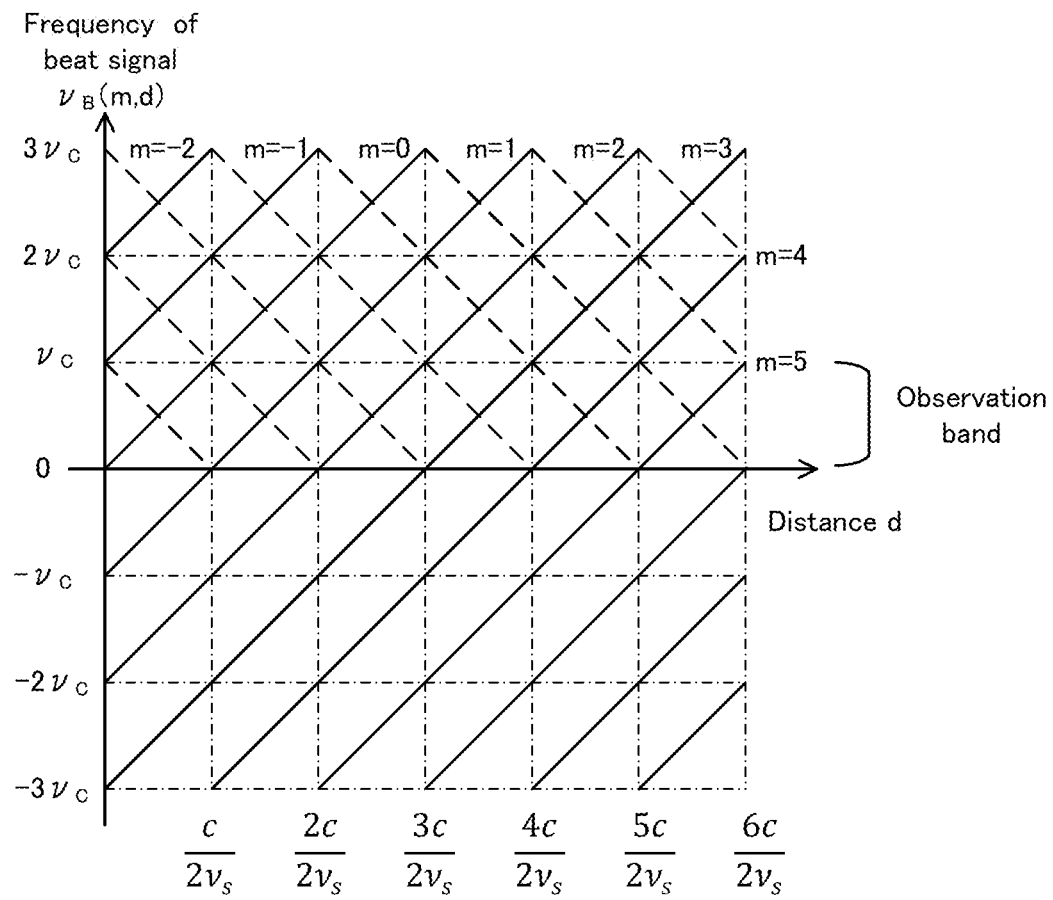
FIG. 4 shows an example of a relationship between (i) a frequency of the beat signal detected by the measurement apparatus 100 according to the present embodiment and (ii) a distance d between an optical head part 140 and the object to be measured 10.

FIG. 4 shows an example of the relationship between the frequency of the beat signal detected by measurement apparatus 100 according to the present embodiment and the distance d between the optical head part 140 and the object to be measured 10. In FIG. 4, the horizontal axis indicates the distance d, and the vertical axis indicates the frequency $v_B(m, d)$ of the beat signal. The plurality of straight lines shown by the solid lines in FIG. 4 are graphs showing the relation of the frequency $v_B(m, d)$ of the beat signal with respect to the distance d for each of the plurality of values of m, as shown in Equation 5.

As shown in FIG. 4, a plurality of beat signals corresponding to the value of m are generated. However, since the plurality of longitudinal modes included in each of the reflected light and the reference light are arranged at approximately constant frequency intervals $v_c$, a plurality of beat signals having equal values of m are superimposed on the approximately same frequency on the frequency axis. For example, when a frequency band between frequencies 0 and $v_c$ is observed, a plurality of beat signals are superimposed on approximately the same frequency and are observed as a single line spectrum.

In addition, the absolute value of the frequency $v_B$ (m, d) of the beat signal in the negative range smaller than 0 is further observed as the image signal. That is, the graph of the region in which the vertical axis of FIG. 4 is smaller than 0 is folded back with a frequency 0 as a boundary. FIG. 4 shows the folded image signal by a plurality of dotted lines. Since only the positive and negative of the folded image signals are inverted, the image signals are superimposed on the observed frequency axis at the same frequency as the absolute value of the frequency before being folded. For example, when a frequency band between frequencies 0 and $v_c$ is observed, the beat signal and the image signal are respectively located at different frequencies unless the frequencies of the beat signal and the image signal become $v_c/2$.

As described above, in the observation band between the frequencies 0 and $v_c$, two line spectra are generated, which are (i) the beat signal $v_B(m, d)$ and (ii) the image signal $v_B(m', d)$ whose value of m is different from that of the beat signal $v_B(m, d)$. Here, as an example, m'=m+1. In this case, the beat signal generation part 150 can cancel such an image signal by using a quadrature detection. Next, the beat signal generation part 150 and the conversion pan 160 using the quadrature detection will be described.

Figure 5:
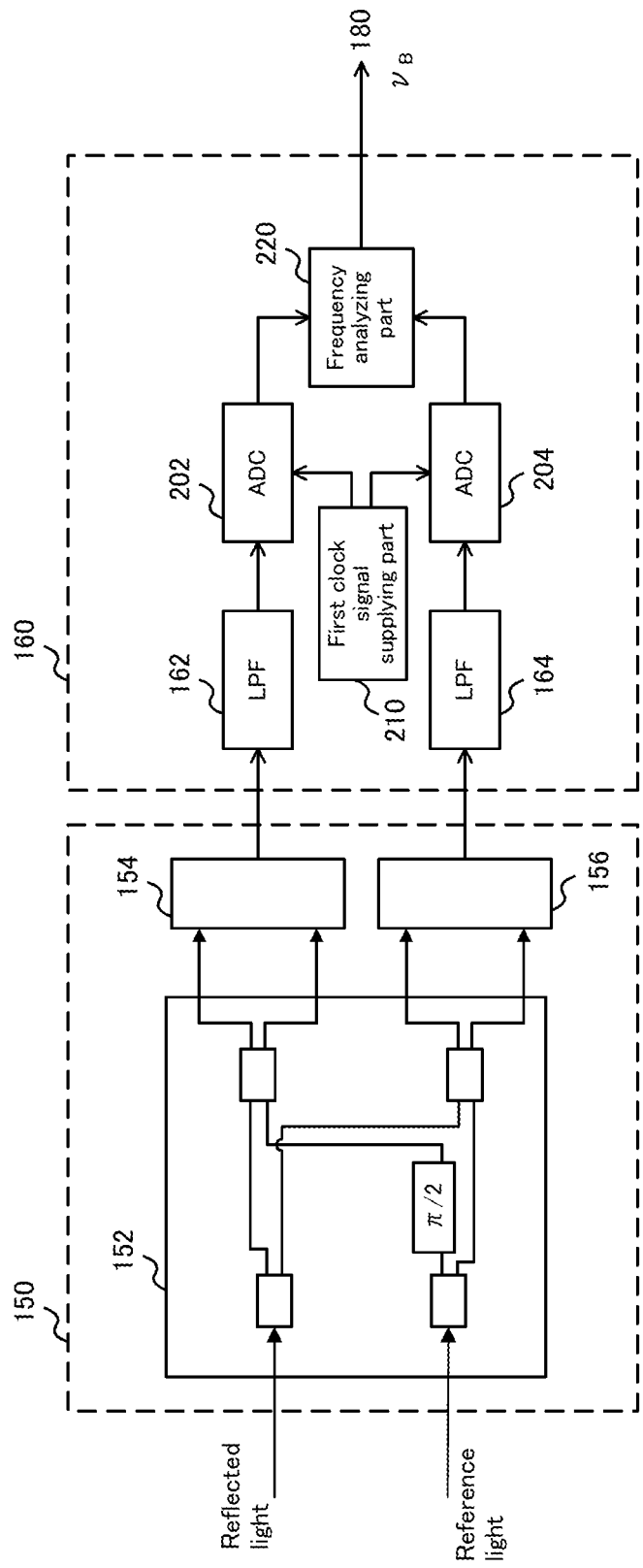
FIG. 5 shows a configuration example of a beat signal generation part 150 and a conversion part 160 according to the present embodiment.

FIG. 5 shows a configuration example of the beat signal generation part 150 and the conversion part 160 according to the present embodiment. The beat signal generation part 150 quadrature-detects the reflected light and the reference light. The beat signal generation part 150 includes an optical 90-degree hybrid 152, a first photoelectric conversion part 154, and a second photoelectric conversion part 156.

The optical 90-degree hybrid 152 respectively branches the input reflected light and the input reference light into two. The optical 90-degree hybrid 152 multiplexes one of the branched reflected lights and one of the branched reference lights with an optical coupler or the like to generate the first beat signal. The optical 90-degree hybrid 152 multiplexes the other branched reflected light and the other branched reference light with the optical coupler or the like to generate the second beat signal. Here, the optical 90-degree hybrid 152 generates a beat signal after generating a phase difference of 90 degrees between the two branched reference lights. For example, the optical 90-degree hybrid 152 multiplexes the branched reflected light with one of the branched reference light and multiplexes the branched reflected light with a light generated by the other branched reference light passing through a π/2 wavelength plate.

The first photoelectric conversion part 154 and the second photoelectric conversion part 156 receive the multiplexed reflected light and reference light and convert them into electrical signals. Each of the first photoelectric conversion part 154 and the second photoelectric conversion part 156 may be a photodiode or the like. Each of the first photoelectric conversion part 154 and the second photoelectric conversion part 156 is, for example, a balanced photodiode. In FIG. 5, suppose that the first photoelectric conversion part 154 generates a first beat signal and the second photoelectric conversion part 156 generates a second beat signal. As described above, the beat signal generation part 150 performs the quadrature detections by multiplexing two reference lights and two reflected lights having phases differing by 90 degrees, respectively, and outputs two beat signals to the conversion part 160.

The conversion part 160 performs a frequency analysis on the two beat signals. Here, an example in which the conversion part 160 performs the frequency analysis using the first beat signal as an I signal and the second beat signal as a Q signal will be described. The conversion part 160 includes a first filter part 162, a second filter part 164, a first AD converter 202, a second AD converter 204, a first clock signal supplying part 210, and a frequency analyzing part 220.

The first filter part 162 and the second filter part 164 reduce signal components in a frequency band differing from a frequency band that a user or the like wants to analyze. Here, the frequency band that the user or the like wants to analyze is set from 0 to $v_c$. The first filter part 162 and the second filter part 164 are, for example, low-pass filters that pass signal components having a frequency equal to or less than $v_c$. In this case, the first filter part 162 supplies the first beat signal obtained by reducing the signal components having a frequency higher than the frequency $v_c$ to the first AD converter 202. Also, the second filter part 164 supplies the second beat signal obtained by reducing the signal components having a frequency higher than the frequency $v_c$ to the second AD converter 204.

The first AD converter 202 and the second AD converter 204 convert analog signals into digital signals. For example, the first AD converter 202 converts the first beat signal into a digital signal, and the second AD converter 204 converts the second beat signal into a digital signal. The first clock signal supplying part 210 supplies first clock signals to the first AD converter 202 and the second AD converter 204. By doing this, the first AD converter 202 and the second AD converter 204 convert the analog signals into the digital signals at approximately the same first sampling rate as a clock frequency of the received first clock signal.

Here, when the observation band is from 0 to $v_C$, the frequency of the beat signals is at most the cavity frequency $v_C$ of the optical cavity. Therefore, the first clock signal supplying part 210 supplies first clock signals having a frequency greater than or equal to twice the cavity frequency $v_C$ of the optical cavity to the first AD converter 202 and the second AD converter 204, whereby the beat signals can be observed.

The frequency analyzing part 220 converts the first beat signal and the second beat signal into frequency data. As an example, the frequency analyzing part 220 performs a digital Fourier transform (DFT) on the first beat signal and the second beat signal. The frequency analyzing part 220 adds the first beat signal converted into the frequency data as the real part and the second beat signal converted into the frequency data as the imaginary part, and cancels the image signal. As described above, the conversion part 160 converts the beat signals into the digital signals at the first sampling rate, and then performs the frequency analysis on the digital signals. It should be noted that after the beat signals are converted into the digital signals, the conversion part 160 may configure a frequency analyzing part 220 using an integrated circuit or the like. The quadrature detection in the beat signal generation part 150 and the frequency analysis in the conversion part 160 will be described below.

Figure 6:
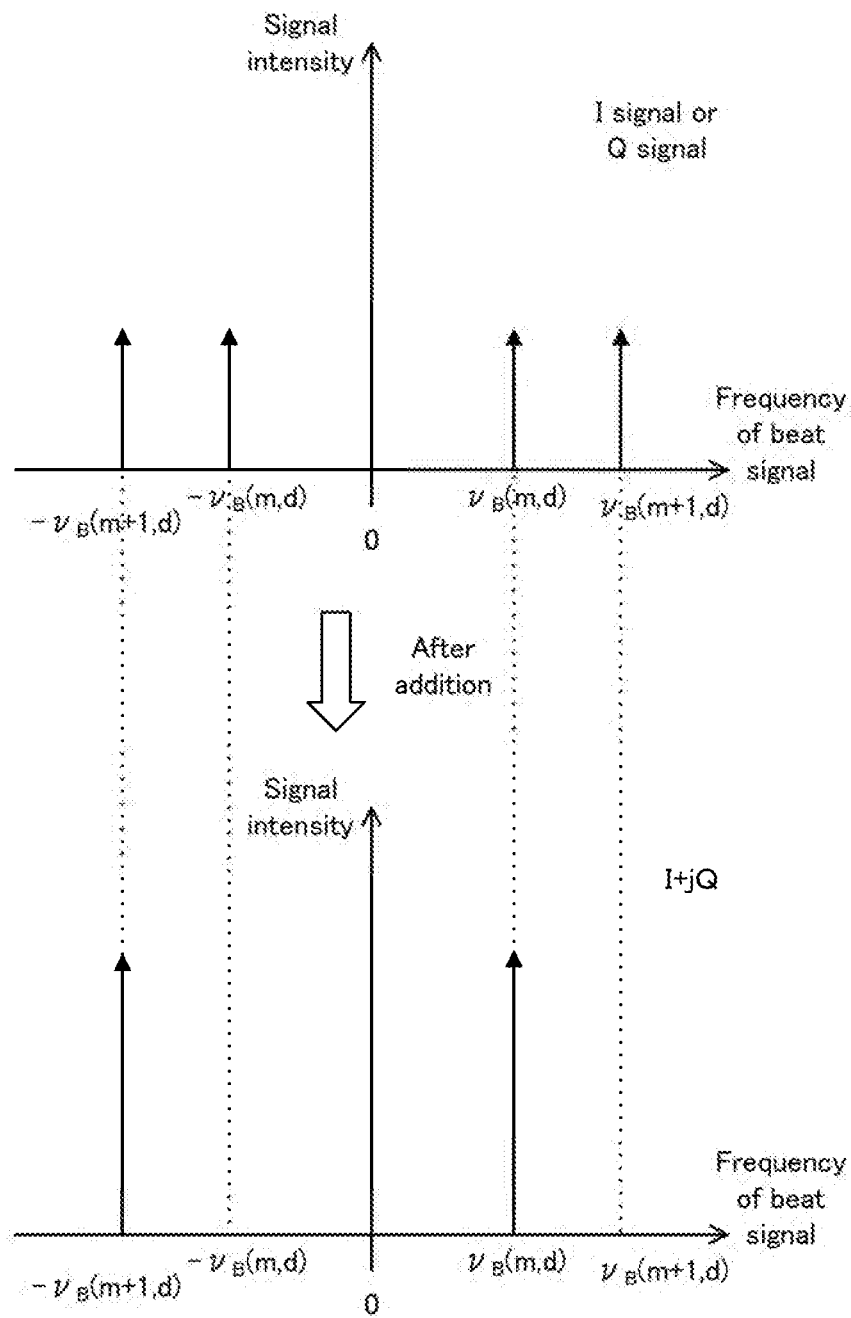
FIG. 6 shows an example of an outline of a quadrature detection by the beat signal generation part 150 and the conversion part 160 according to the present embodiment.

FIG. 6 shows an example of an outline of quadrature detection by the beat signal generation part 150 and the conversion part 160 according to the present embodiment. In FIG. 6, the horizontal axis indicates the frequency of the beat signal, and the vertical axis indicates the signal intensity. FIG. 6 shows a frequency spectrum of one of the I signal and the Q signal. The frequency spectra of both the I and Q signals have approximately the same spectral shape, as shown in the upper part of FIG. 6. In the I signal and the Q signal, for example, a beat signal $v_B(m, d)$ and an image signal $v_B(m+1, d)$ are observed in a frequency band between the frequencies 0 and $v_C$. In this case, in the I and Q signals, a beat signal $-v_B(m, d)$ and an original beat signal $-v_B(m+1, d)$ of the image signal exist in a frequency band between the frequencies 0 and $-v_C$ on the negative side.

Here, since the I signal and the Q signal are signal components being quadrature-detected by the beat signal generation part 150, they include different phase information even if the spectral shapes are the same. For example, in the frequency band between the frequencies 0 and $v_C$ on the positive side, phases of the image signal $v_B(m+1, d)$ of the I signal and the image signal $v_B(m+1, d)$ of the Q signal are mutually inverted. Similarly, in the frequency band between the frequencies 0 and $-v_C$ on the negative side, phases of the beat signal $-v_B(m, d)$ of the I signal and the beat signal $-v_B(m, d)$ of the Q signal are mutually inverted.

Therefore, as shown in the lower part of FIG. 6, when the frequency analyzing part 220 calculates I+jQ using the I signal and the Q signal, the beat signals of the frequency $v_B(m, d)$ strengthen each other and the image signals of the frequency $v_B(m+1, d)$ cancel each other out in the frequency band between the frequencies 0 and $v_C$. Similarly, in the frequency band between the frequencies 0 and $-v_C$, the beat signals of the frequency $-v_B(m+1, d)$ strengthen each other and the beat signals of the frequency $-v_B(m, d)$ cancel each other out.

According to the frequency analysis result of the frequency analyzing part 220, one beat signal is observed for the frequency $v_B(m, d)$ in the frequency band between the frequencies 0 and $v_C$. Since the measurement apparatus 100 can cancel out the image signal in this manner, the frequency $v_B(m, d)$ of the beat signal can be detected. For example, the frequency analyzing part 220 outputs, as the frequency $v_B(m, d)$ of the beat signal, a frequency at which the signal intensity of the converted frequency signal is highest.

Here, the distance d measured by the measurement apparatus 100 is expressed by Equation 6. From Equation 6, it can be seen that the distance d can be calculated by using three frequencies $v_C$, $v_s$, and $v_B(m, d)$. Among the three frequencies, $v_B(m, d)$ can be detected as described above. Also, since $v_C$ and $v_s$ are the frequencies determined based on components used in the laser apparatus 110, $v_C$ and $v_s$ should ideally be fixed values. Here, since $v_s$ is the amount of frequency shift by the frequency shifter 112, $v_s$ can substantially be regarded as the fixed value by using a device with a stable shin amount as the frequency shifter 112.

On the other hand, since $v_C$ corresponds to an optical length of the cavity of the laser apparatus 110, it may change due to environmental fluctuations such as temperature. For example, if the laser apparatus 110 is the fiber ring laser, as described in FIG. 2, and the cavity is formed by optical fibers, the cavity length may change by approximately 10 ppm when an ambient temperature changes by one degree Celsius. It should be noted that even if the laser apparatus 110 is a solid-state laser such as a semiconductor laser or the like, the cavity length may be changed by such environmental fluctuations. Therefore, the extraction part 170 extracts the cavity frequency corresponding to the cavity length in order to monitor such a change in the cavity length. The extraction part 170 will be described below.

Figure 7:
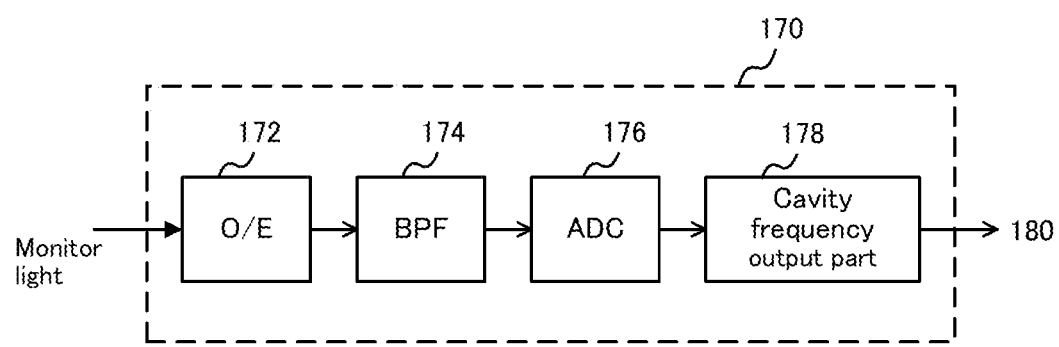
FIG. 7 shows a configuration example of an extraction part 170 according to the present embodiment.

FIG. 7 shows a configuration example of the extraction part 170 according to the present embodiment. The extraction part 170 includes a photoelectric conversion part and extracts the signal component corresponding to the cavity frequency of the optical cavity from electrical signals convened by the photoelectric conversion part. The extraction part 170 includes a third photoelectric conversion part 172, a third filter part 174, a third AD converter 176, and a cavity frequency output part 178.

The third photoelectric conversion part 172 converts the monitor light into an electrical signal. The third photoelectric conversion part 172 may be a photodiode or the like. As described in FIG. 4, the laser apparatus 110 outputs the frequency modulated laser beam having the plurality of longitudinal modes arranged at frequency intervals which approximately match the cavity frequency $v_C$. Therefore, when the third photoelectric conversion part 172 performs a photoelectrical conversion on the frequency-modulated laser beam, an electrical signal including the cavity frequency $v_C$ is outputted.

The third filter part 174 passes, within the electrical signal converted by the third photoelectric conversion part 172, a signal component having the cavity frequency $v_C$ of the optical cavity. The third filter part 174 has, for example, at least one of a high-pass filter, a low-pass filter, a band-pass filter, and a band-rejection filter. FIG. 7 shows an example in which the third filter part 174 is the band-pass filter.

The third AD converter 176 converts inputted analog signals into digital signals. The third AD converter 176 converts analog signals into digital signals in synchronization with a clock signal having a frequency greater than or equal to twice the resonant frequency $v_C$. The third AD converter 176, for example, operates when receiving the clock signal from the first clock signal supplying part 210.

The cavity frequency output part 178 performs the frequency analysis on the signal components that have passed through the third filter part 174. The cavity frequency output part 178 first converts the digital signal output from the third AD converter 176 into frequency data. As an example, the cavity frequency output part 178 performs a digital Fourier transform (DFT) on the digital signal. The cavity frequency output part 178 frequency-analyzes the frequency data and outputs a cavity frequency $v_C$. For example, the cavity frequency output part 178 outputs, as the cavity frequency $v_C$, a frequency at which the signal intensity of the frequency data is the largest.

As described above, the extraction part 170 shown in FIG. 7 extracts the signal component of the cavity frequency $v_C$ from the monitor light and outputs the signal component of the cavity frequency $v_C$. Therefore, even if the cavity length of the laser apparatus 110 changes due to a fluctuation in the ambient temperature, the extraction part 170 can extract and output the signal component of the cavity frequency $v_C$ which corresponds to the change. Since the calculation part 180 uses the fixed value $v_s$, $v_B(m, d)$ detected in the above-described manner, and the cavity frequency $v_C$, it is possible to calculate a distance d corresponding to the fluctuation in the ambient temperature.

As described above, even if the environmental fluctuations occur, the measurement apparatus 100 can suppress the reduction of measurement accuracy, since the measurement apparatus 100 monitors the cavity frequency $v_C$ corresponding to the environmental fluctuations and reflects the cavity frequency $v_C$ in the calculation of the distance d. Alternatively or additionally, the laser apparatus 110 may be placed in a temperature-stabilized controlled chamber, such as a thermostatic chamber, to reduce influence of environmental fluctuations and to suppress the reduction of measurement accuracy of the measurement apparatus 100.

However, since the above-mentioned measurement apparatus 100 tends to be a large-scale apparatus, problems such as increases in cost, problems relating to circuit adjustment, installation area, and the like may occur. Further, when an observation result of the change in the cavity length is used for the distance measurement, observation variation in the cavity length is superimposed on variation in the distance measurement, which causes an increase of variation in the distance measurement. Here, supposing that the variation in the distance measurement is $\Delta d$, variation in a measurement of the beat signal is $\Delta v_B$, and variation in a measurement of the cavity frequency is $\Delta v_C$ the variation in the distance measurement $\Delta d$ is expressed by the following equation.

$$(\Delta d)^2 = \left(\frac{\partial d}{\partial v_B}\right)^2 \cdot (\Delta v_B)^2 + \left(\frac{\partial d}{\partial v_C}\right)^2 \cdot (\Delta v_C)^2 \quad \text{[Equation 7]}$$

As shown in Equation 7, by using the measurement result of the cavity frequency, it can be understood that the variation in the distance measurement $\Delta d$ increases by a term including the measurement variation $\Delta v_C$ of the cavity frequency. Therefore, the measurement apparatus according to the present embodiment enables the measurement of a distance with high accuracy by reducing the measurement variation $\Delta v_C$ of the cavity frequency. Next, such a measurement apparatus will be described.

[Configuration Example of a Measurement Apparatus 300]

Figure 8:
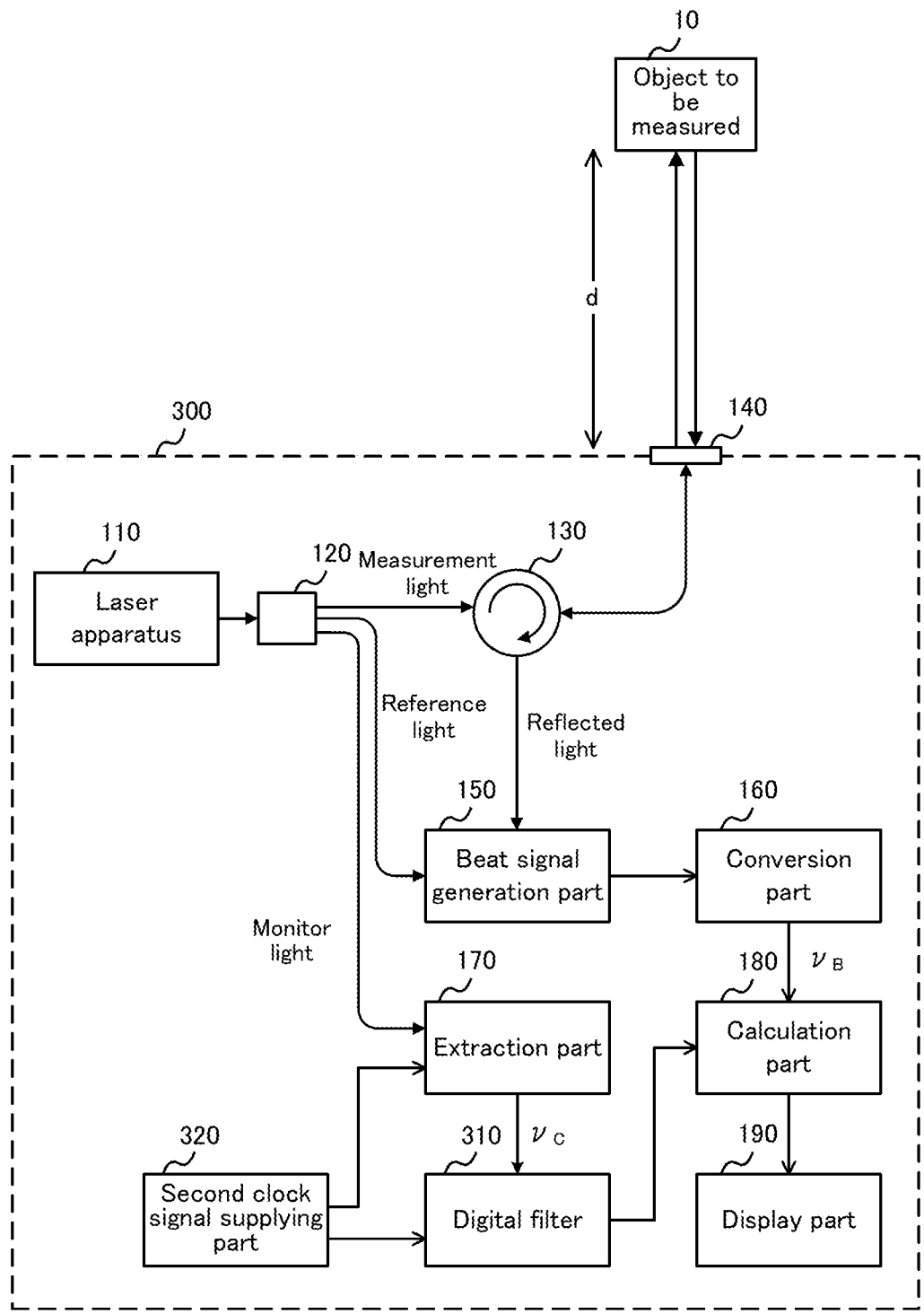
FIG. 8 shows a configuration example of a measurement apparatus 300 according to the present embodiment together with the object to be measured 10.

FIG. 8 shows a configuration example of a measurement apparatus 300 according to the present embodiment together with the object to be measured 10. In the measurement apparatus 300 shown in FIG. 8, operations approximately the same as those of the measurement apparatus 100 according to the present embodiment shown in FIG. 1 are denoted by the same reference numerals, and descriptions thereof are omitted. The measurement apparatus 300 further includes a digital filter 310 and a second clock signal supplying part 320.

The digital filter 310 digitally filters the signal components extracted by the extraction part 170. The digital filter 310 filters the cavity frequency $v_C$ extracted from the monitor light by the extraction part 170 and reduces the measurement variation $\Delta v_C$ of the cavity frequency $v_C$. The digital filter 310 is, for example, a Kalman filter, a Gaussian filter, a moving average filter, or the like. Also, the digital filter 310 may further include a thinning filter, high-pass filter, a low-pass filter, a band-pass filter, and/or a band-rejection filter or the like.

The second clock signal supplying part 320 supplies a second clock signal to the digital filter 310. The second clock signal supplying part 320 may also supply the second clock signal to the extraction part 170. A clock frequency of the second clock signal is, for example, a clock frequency substantially the same as the clock frequency of the first clock signal. Alternatively, the clock frequency of the second clock signal may be a frequency lower than the clock frequency of the first clock signal.

Since an extraction of the cavity frequency $v_C$ performed by the extraction part 170 and a filtering process performed by the digital filter 310 are for measuring fluctuation of the cavity frequency $v_C$ caused by the environmental temperature or the like, the clock frequency used for these processing operations may be relatively low. For example, the second clock signal used by the extraction part 170 and the digital filter 310 may have a clock frequency lower than the clock frequency of the first clock signal which is used for measuring the beat signal for measuring the difference of the propagation distance between the reference light and the measurement light.

Therefore, the second clock signal supplying part 320 supplies the second clock signal having a lower clock frequency than the first clock signal to the digital filter 310. By doing this, the digital filter 310 digitally filters the signal components extracted by the extraction part 170 at a second sampling rate which is slower than the first sampling rate. The third AD converter 176 may also receive the second clock signal from the second clock signal supplying part 320 and convert analog signals which are input at the second sampling rate into digital signals. This enables, for example, an AD converter, which is slower and more affordable than the first AD converter 202 and the second AD converter 204, to be used as the third AD converter 176.

Figure 9:
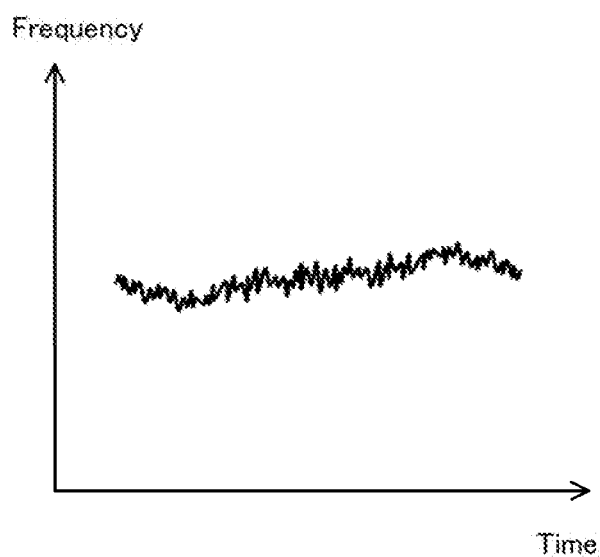
FIG. 9 shows an example of a cavity frequency $v_C$ which is output by the extraction part 170 according to the present embodiment.

FIG. 9 shows an example of the cavity frequency $v_C$ which is output by the extraction part 170 according to the present embodiment. The horizontal axis of FIG. 9 indicates the time and the vertical axis indicates the frequency. The cavity frequency $v_C$ output by the extraction part 170 becomes, for example, a signal waveform on which (i) the measurement variation $\Delta v_C$ of the cavity frequency $v_C$ and (ii) fluctuation which is slower than this measurement variation $\Delta v_c$ caused by the ambient temperature or the like, are superimposed.

Figure 10:
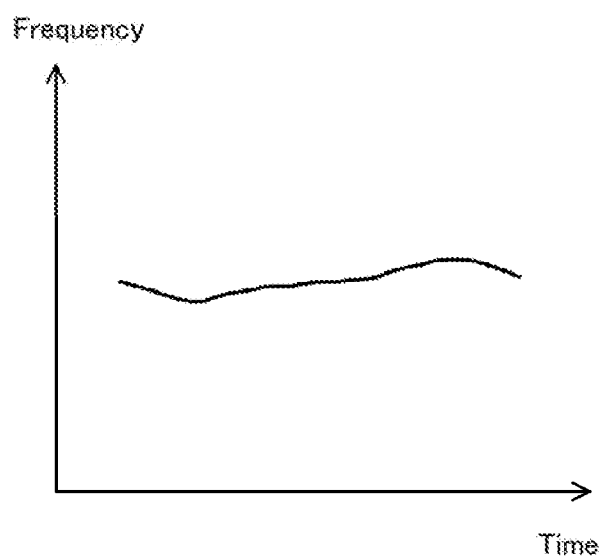
FIG. 10 shows an example of the cavity frequency $v_C$ which is filtered and output by a digital filter 310 according to the present embodiment.

FIG. 10 shows an example of the cavity frequency $v_C$ which is filtered and output by the digital filter 310 according to the present embodiment. In FIG. 10, in a similar manner as in FIG. 9, the horizontal axis indicates the time and the vertical axis indicates the frequency. As shown in FIG. 10, the digital filter 310 outputs the cavity frequency $v_C$ having the reduced measurement variation $\Delta v_C$ superimposed on the signal waveform. Such a filtering process of the digital filter 310 can be realized by a known algorithm or the like without providing a special device or the like. Further, since the operation of the digital filter 310 can be slower than the operation of conversion part 160, it is possible to configure such a digital filter with a simple configuration which is low in cost and consumes little power.

The calculation part 180 calculates the difference of the propagation distance between the reference light and the measurement light on the basis of the result of frequency analysis of the beat signal and the digitally filtered signal components. Since the calculation part 180 uses the fixed value $v_s$, $v_B(m, d)$ detected in the above-described manner, and the cavity frequency $v_C$, it is possible to calculate the distance d corresponding to the fluctuation in the ambient temperature. As described above, since the measurement apparatus 300 uses the cavity frequency $v_C$ in which the measurement variation $\Delta v_C$ is reduced by the digital filter 310, the distance d to the object to be measured 10 can be measured with high accuracy while suppressing an increase in cost.

As shown in FIG. 10, the above described calculation part 180 can acquire a waveform showing temporal variation of the cavity frequency $v_C$ with the reduced observation variation $\Delta v_C$ from the digital filter 310. Therefore, the calculation part 180 can also observe a phenomenon in which the cavity frequency $v_C$ fluctuates significantly due to an activation of the measurement apparatus 300, a rapid change in the ambient temperature, a momentary voltage drop of a power supply, a short-term supply stop of the power supply (momentary stop, short interruption) or the like.

As described above, the calculation part 180 may calculate the distance d to the object to be measured 10 in consideration of such fluctuation of the cavity frequency $v_C$, but may avoid performing an accurate measurement under a circumstance where the environmental fluctuations occur rapidly. Therefore, the calculation part 180 may determine the stability of the measurement by the measurement apparatus 300 on the basis of the fluctuation of the cavity frequency $v_C$, and control whether or not to perform the measurement according to a determination result. Next, the measurement apparatus 300 provided with such a calculation part 180 will be described.

[Variation Example of the Measurement Apparatus 300]

Figure 11:
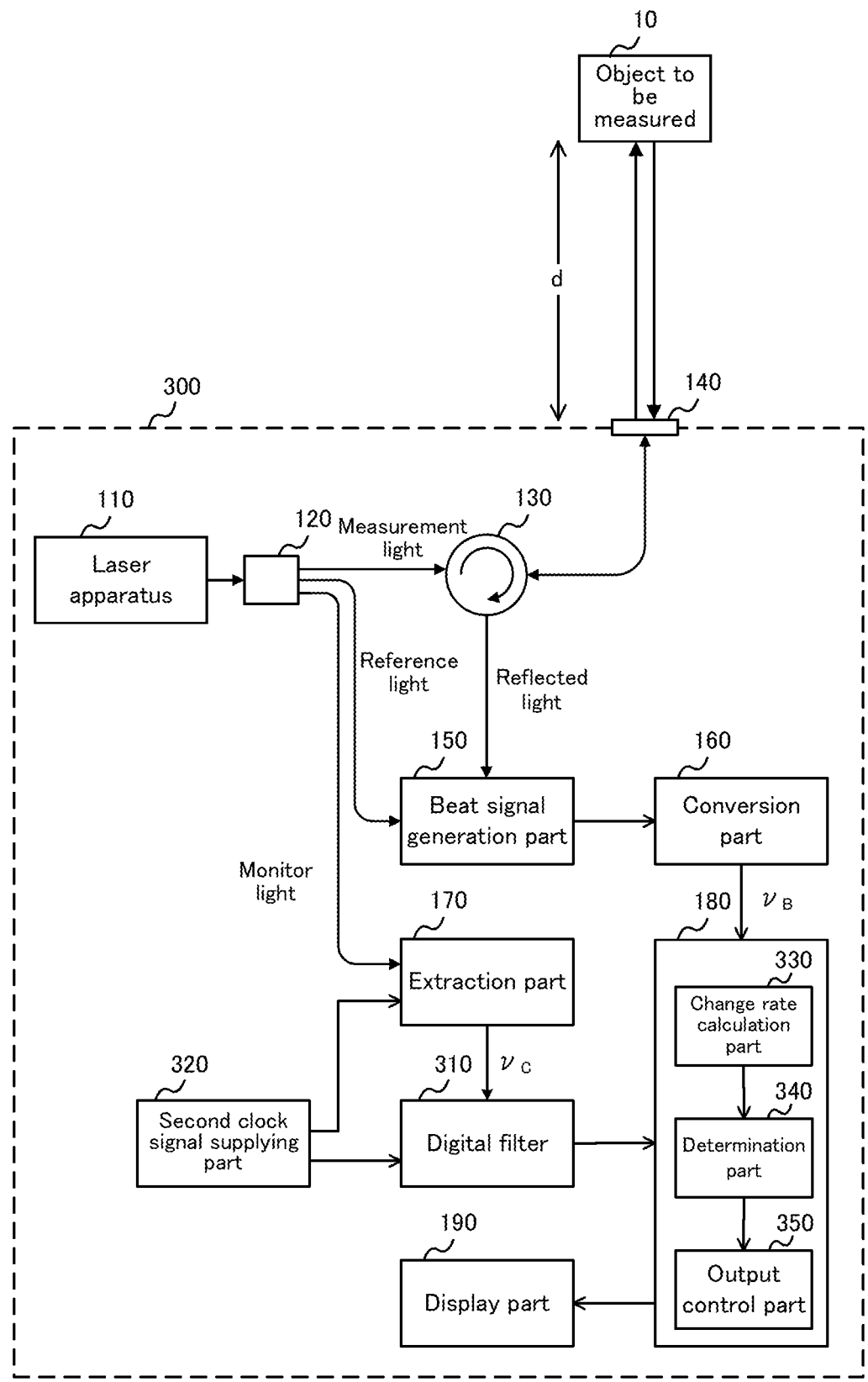
FIG. 11 shows a variation example of the measurement apparatus 300 according to the present embodiment together with the object to be measured 10.

FIG. 11 shows a variation example of the measurement apparatus 300 according to the present embodiment together with the object to be measured 10. In the measurement apparatus 30 shown in FIG. 11, operations approximately the same as those of the measurement apparatus 300 according to the present embodiment shown in FIG. 8 are denoted by the same reference numerals, and descriptions thereof are omitted. In the measurement apparatus 300 according to the Variation example, the calculation part 180 further includes a change rate calculation part 330, a determination part 340, and an output control part 350.

The change rate calculation part 330 calculates a change rate per unit time of the digitally filtered signal components. The change rate calculation part 330 calculates the change rate per unit time, for example, in response to acquiring signal values of a predetermined number of cavity frequencies $v_C$ from the digital filter 310. The change rate calculation part 330 may calculate the change rate per unit time for each predetermined period of time.

The determination part 340 determines the stability of the measurement by the measurement apparatus 300 on the basis of the change rate per unit time. The determination part 340 stores in advance, for example, a range of the change rate within which the measurement result of the measurement apparatus 300 is stable. Then, the determination part 340 determines that the measurement apparatus 300 can stably perform a measurement in response to a calculation result of the change rate of the change rate calculation part 330 being within the stored range of change rate. In this case, the determination part 340 determines that the measurement apparatus 300 is stable when the calculated value of the change rate is equal to or greater than a first threshold value and equal to or less than a second threshold value.

The output control part 350 supplies the calculation result of the distance d to the display part 190 based on a determination result of the measurement apparatus 300. The output control part 350 supplies the calculation result of the distance d to the display part 190, for example, when the measurement apparatus 300 can stably perform the measurement. Also, the output control part 350 does not need to supply the calculation result of the distance d to the display part 190 when the measurement apparatus 300 cannot perform the measurement stably. In this manner, the display part 190 can output only a result of the measurement apparatus 300 stably measuring the distance d. This enables the user or the like of the measurement apparatus 300 to use only the measurement result measured by the measurement apparatus 300 in a stable operating environment of the measurement apparatus 300.

Alternatively, when the measurement apparatus 300 cannot perform the measurement stably, the output control part 350 supplies the calculation result of the distance d to the display part 190 and notifies the display part 190 that the measurement environment was unstable. In this case, the display part 190 displays the calculation result of the distance d together with, for example, "reference value," "measurement environment is fluctuating," and the like. This enables the user or the like of the measurement apparatus 300 to easily know whether or not the measurement apparatus 300 has performed measurement in a stable environment, and can effectively use the measurement result.

Although the measurement apparatus 300 according to the present embodiment includes the second clock signal supplying part 320 and supplies the second clock signal to the digital filter 310, the present disclosure is not limited thereto. For example, the first clock signal supplying part 210 may supply the first clock signal to the digital filter 310. In this case, it is desirable for the digital filter 310 to have a conversion circuit, a filter, etc., and to perform filtering using a clock signal obtained by converting the first clock signal into a lower frequency. Further, the first clock signal supplying part 210 may supply the first clock signal to the extraction part 170, and in this case, the second clock signal supplying part 320 may not be provided.

It is preferable that at least a part of the conversion part 160, the extraction part 170, and the calculation part 10 provided in the measurement apparatus 100 and the measurement apparatus 300 according to the present embodiment is formed of an integrated circuit or the like. At least apart of the conversion part 160, the extraction part 170, and the calculation part 180, for example, includes a field programmable gate array (FPGA), a digital signal processor (DSP), and/or a central processing unit (CPU).

When at least a part of the conversion part 160, the extraction part 170, and the calculation part 180 is configured by a computer or the like, that part includes a storage unit and a control unit. The storage unit includes, for example, a read only memory (ROM) storing a basic input output system (BIOS) or the like of a computer or the like that realizes the conversion part 160, the extraction part 170, and the calculation part 180, and a random access memory (RAM) serving as a work area. The storage unit may also store an operating system (OS), programs, applications, and/or various pieces of information. The storage unit may include a large-capacity device like a hard disk drive (HDD) and/or a solid state drive (SSD).

The control unit is a processor such as a CPU, and functions as at least a part of the conversion part 160, the extraction part 170, and the calculation part 180 by executing programs stored in the storage unit. The control unit may include a graphics processing unit (GPU) or the like.

The present disclosure is explained on the basis of the exemplary embodiments. The technical scope of the present invention is not limited to the scope explained in the above embodiments and it is possible to make various changes and modifications within the scope of the invention. For example, all or part of the apparatus can be configured with any unit which is functionally or physically distributed or integrated. Further, new exemplary embodiments generated by arbitrary combinations of them are included in the exemplary embodiments of the present invention. Further, effects of the new embodiment brought by the combinations also have the effect of the original exemplary embodiment together.

What is claimed is:

1. A measurement apparatus for measuring a distance to an object to be measured, the measurement apparatus comprising:
   a laser apparatus that has an optical cavity and outputs a frequency-modulated laser beam with a plurality of modes;
   a branch that branches a portion of the frequency-modulated laser beam output by the laser apparatus as a reference light and at least some of the remaining portion of the frequency-modulated laser beam as a measurement light;
   a beat signal generator that generates a beat signal by mixing the reference light and a reflected light that is reflected by radiating the measurement light onto the object to be measured;
   a converter that converts the beat signal into a digital signal at a first sampling rate and then outputs a frequency $v_B(m, d)$ of the beat signal by a frequency analysis on the digital signal;
   an extractor that extracts a signal component of a cavity frequency $v_c$ of the optical cavity and being superimposed on the frequency-modulated laser beam output from the laser apparatus;
   a digital filter that digitally filters the extracted signal component at a second sampling rate; and
   calculation circuitry configured to calculate a difference in a propagation distance between the reference light and the measurement light by substituting the frequency $v_B(m, d)$ of the beat signal and the digitally filtered extracted signal,
   the cavity frequency $v_c$ of the optical cavity into the following equation:

$$d = \frac{c}{2v_s v_c}\{v_B(m, d) + mv_c\}$$

where m is an interval between longitudinal mode numbers of the reflected and reference beams of the frequency-modulated laser light, c is optical velocity, and $v_s$ is frequency shift amount of the frequency-modulated laser beam.

2. The measurement apparatus according to claim 1, wherein the digital filter digitally filters the extracted signal component at the second sampling rate which is slower than the first sampling rate.

3. The measurement apparatus according to claim 1, wherein the branch branches the frequency-modulated laser beam into the reference light, the measurement light, and a monitor light, and
   the extractor includes a photoelectric converter that converts the monitor light into an electrical signal, and extracts the signal component corresponding to the cavity frequency of the optical cavity from within the electrical signal converted by the photoelectric converter.

4. The measurement apparatus according to claim 3, wherein the extractor further includes:
   a filter that passes the signal component having a cavity frequency of the optical cavity from within the electrical signal converted by the photoelectric converter; and
   cavity frequency output circuity that performs the frequency analysis on the signal component that has passed through the filter part and outputs the cavity frequency of the optical cavity.

5. The measurement apparatus according to claim 4, wherein the extractor further includes an AD converter that converts the signal component having passed the filter into a digital signal at the second sampling rate, and
   the cavity frequency output circuity converts the digital signal output from the AD converter into frequency data and frequency-analyzes the frequency data.

6. The measurement apparatus according to claim 1, wherein the calculation circuitry is further configured to:
   calculate a change rate per unit time of the digitally filtered signal component; and
   determine a stability of a measurement by the measurement apparatus on the basis of the change rate per unit time.

7. The measurement apparatus according to claim 6, wherein the calculation circuitry is further configured to determine that the measurement apparatus is stable when a calculated value of the change rate is equal to or greater than a first threshold value and equal to or less than a second threshold value.

8. The measurement apparatus according to claim 7, wherein the calculation circuitry is further configured to instruct display a calculation result of the calculation on a display, and supply the calculation result to the display based on a determination result of the determination of the stability of the measurement.

9. A measurement method for measuring a distance to an object to be measured, the measurement method comprising:
   outputting a frequency-modulated laser beam with a plurality of modes from a laser apparatus having an optical cavity;
   branching a portion of the frequency-modulated laser beam as a reference light and at least some of the remaining portion as a measurement light;
   generating a beat signal by mixing the reference light and a reflected light that is reflected by radiating the measurement light onto the object to be measured;
   converting the beat signal into a digital signal at a first sampling rate and then outputs a frequency $v_B(m, d)$ of the beat signal by a frequency analysis on the digital signal;

extracting a signal component of a cavity frequency $v_c$ of the optical cavity and being superimposed on the frequency-modulated laser beam;

digitally filtering the signal component at a second sampling rate; and calculating a difference in a propagation distance between the reference light and the measurement light by substituting the frequency $v_B(m, d)$ of the beat signal and the digitally filtered extracted signal, the cavity frequency $v_c$ of the optical cavity into the following equation:

$$d = \frac{c}{2v_s v_c}\{v_B(m, d) + mv_c\}$$

where m is an interval between longitudinal mode numbers of the reflected and reference beams of the frequency-modulated laser light, c is optical velocity, and $v_s$ is frequency shift amount of the frequency-modulated laser beam.

10. The measurement method according to claim 9, further comprising:

calculating a change rate per unit time of the digitally filtered said signal component; and determining a stability of a measurement on the basis of the change rate per unit time.

* * * * *